Oct. 2, 1962 G. A. GROVER 3,056,861
PHONOGRAPH PICKUP
Filed Sept. 24, 1959 2 Sheets-Sheet 1

INVENTOR.
George A. Grover
BY
Graf, Nierman & Burmeister
Attorneys

INVENTOR.
George A. Grover
BY
Graf, Niersman & Burmeister
Attorneys

United States Patent Office 3,056,861

Patented Oct. 2, 1962

3,056,861

PHONOGRAPH PICKUP

George A. Grover, Niles, Mich., assignor to Electro-Voice, Incorporated, Buchanan, Mich., a corporation of Indiana Filed Sept. 24, 1959, Ser. No. 842,098

9 Claims. (Cl. 179—100.41)

The present invention relates to phonograph pickups, and particularly to phonograph pickups for reproducing stereophonic records.

The patent application of Howard M. Durbin and John F. Wood entitled "Phonograph Pickup," Serial No. 736,819, filed May 21, 1958, disclose a phonograph pickup which employs a pair of bender type piezoelectric generating elements disposed within a casing and coupled to a drive arm through a compliant yoke. The drive arm carries a stylus at one end, and is compliantly mounted to the casing at the other end.

Bender type generating elements suitable for use in the Durbin and Wood construction described above are generally of the ceramic piezoelectric type, such as electrically polarized barium titanate or electrically polarized lead zirconium titanate, and relatively costly on the commercial market. It is therefore one of the objects of the present invention to provide a phonograph pickup for both stereophonic and monaural records which utilizes piezoelectric crystals. Most piezoelectric crystals produce optimum response to twisting, rather than bending, and therefore it is an object of the present invention to provide a phonograph pickup for monaural and stereophonic records which utilizes twister type piezoelectric generating elements.

The drive arm constructions of the phonograph pickup described in the Durbin and Wood application referred to above is also relatively costly. It is therefore a further object of the present invention to provide a phonograph pickup which utilizes a drive arm for coupling the stylus to the piezoelectric generating element which is integral with the casing.

These and further objects of the present invention will be readily apparent to those skilled in the art from a further reading of this disclosure, particularly when viewed in the light of the drawings, in which.

Figure 1:
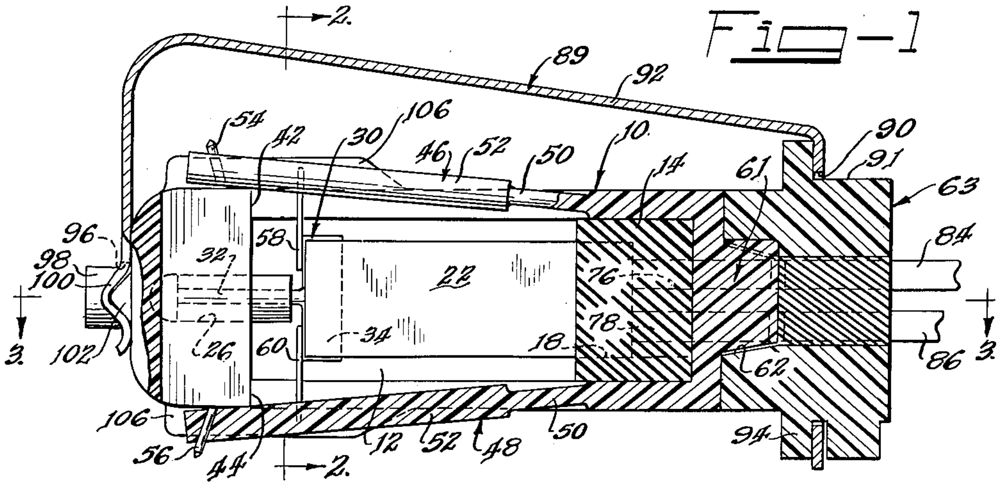
FIGURE 1 is a transverse sectional view of a phonograph pickup constructed according to the teachings of the present invention.
Figure 2:
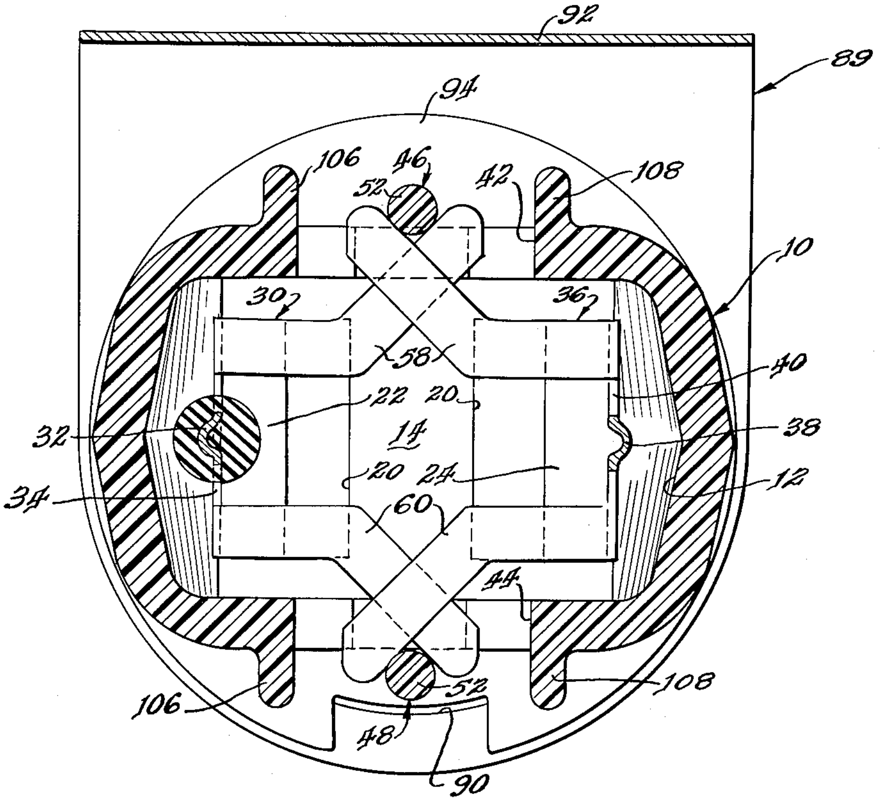
FIGURE 2 is a sectional view taken along the line 2—2 of FIGURE 1.
Figures 3, 4:
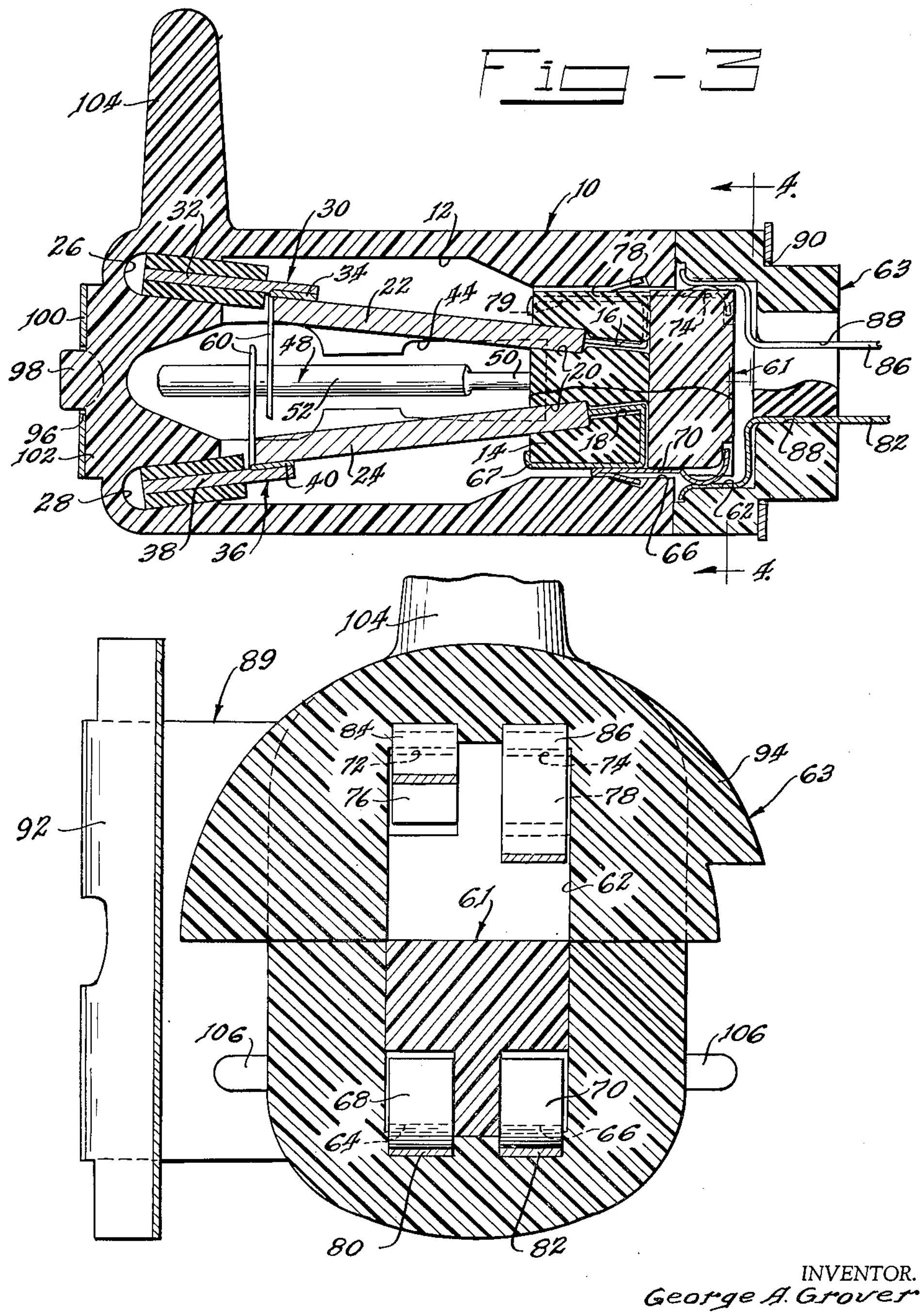
FIGURE 3 is a sectional view taken along the line 3—3 of FIGURE 1.
FIGURE 4 is a sectional view taken along the line 4—4 of FIGURE 3.

The figures illustrate a preferred construction of the present invention, and the phograph pickup illustrated in the figures utilizes a casing 10 having a cavity 12 disposed therein. The cavity 12 is elongated, and a compliant mounting pad 14 is disposed at one end of the cavity 12. The mounting pad 14 has two spaced slots 16 and 18 which extend therethrough, and the slots 16 and 18 are disposed on planes normal to a common plane and at a slight angle to each other. Each of the slots 16 and 18 has an enlarged portion 20 at its end remote from the end of the casing, and one end of one of a pair of piezoelectric crystals is disposed in the enlarged portion 20 of each of the slots 16 and 18, these crystals being designated 22 and 24, respectively. The crystals 22 and 24 extend into the cavity 12 from the mounting pad 14, and terminate at a distance from the end of the cavity opposite the mounting pad. The crystals 22 and 24 are of quadrangular shape with their major axis extending from the mounting pad 14 and their minor axis in the planes referred to above.

The housing 10 is provided with a bore aligned with the central major axis of each of the crystals 22 and 24 confronting the end thereof opposite the mounting pad 14, these bores being designated 26 and 28, respectively. A pivot and lever arm member 30 has a shaft portion 32 which is journaled within the bore 26, and is affixed to the end of the crystal 22 opposite the mounting pad 14. The pivot and lever arm member 30 has a plate portion 34 which abouts the surface of the crystal 22 remote from the crystal 24, and is secured thereto by cement. In like manner, a pivot and lever arm member 36 has a shaft portion 38 journaled in the bore 28 and a plate portion 40 secured to the surface of the crystal 24 adjacent to the end of the crystal remote from the mounting pad 14.

The casing 10 is provided with two elongated openings 42 and 44 disposed on opposite sides of the central axis of the casing and aligned confronting the portion of the cavity 12 between the crystals 22 and 24. A drive arm 46 generally parallel to the central axis of the casing is disposed in the opening 42 and extends from the casing adjacent to the mounting pad 14 to a point spaced from the opposite end of the opening 42. In like manner, a drive arm 48 extends from the casing adjacent to the mounting pad 14 across the opening 44 and is spaced from the casing at its opposite end. Both of the drive arms 46 and 48 have restricted portions 50 adjacent to the connection of the drive arm and the casing. Likewise, the drive arms 46 and 48 have portions of expanded diameter 52 extending from the restricted portions 50 to the opposite ends thereof. The drive arms 46 and 48 are constructed integrally with the casing 10, although it is to be understood that the drive arms may also be mounted to the casing as by cement or some other means. Each of the drive arms 46 and 48 carries a stylus 54 and 56, respectively, at the ends thereof remote from the restricted portions 50 thereof.

The pivot and lever arm members 30 and 36 which engage the crystals 22 and 24 are each provided with two lever arm portions 58 and 60. The lever arm portions 58 and 60 extend normally relative to each other from each of the members 34, and the lever arm portions 58 and 60 extend normally relative to each other from each of the members 34, and the lever arm portion are also disposed at an angle of approximately 45 degrees with respect to the transverse axis of the crystal 22 or 24 to which that member 34 or 36 is attached. The two lever arm portions 60 of the members 30 and 36 abut the confronting surface of the drive arm 48, while the two lever arm portions 58 of the members 30 and 36 abut the confronting surface of the drive arm 46. The drive arm 48 is thus cradled between the lever arm portions 60, while the drive arm 46 is cradled between the lever arm portions 58. With this construction, the styli 54 and 56 are disposed in approximately the same plane which also traverses the central axis of the casing 10.

The casing 10 is provided with an outwardly extending generally rectangular protrusion 61 at its end adjacent to the mounting pad 14, and this protrusion 61 is accommodated within a recess 62 of a socket 63. A pair of slots 64 and 66 extend through the end of the casing 10 adjacent to and aligned with the one side surface of the protrusion 61, the slots 64 and 66 terminating in spaced indentations on the surface of the protrusion. A pair of parallel spaced electrically conducting strips 68 and 70 extend through the slots 64 and 66, respectively, in the protrusion 61 and are bent to terminate in abutment with the surface of the protrusion 61 confronting the socket 63. A pair of spaced electrically conducting foils 67 are secured to opposite parallel surfaces of the crystal 24 and extend through the slot 18 to the protrusion 61; and the foils then extend between the mounting block 14 and the protrusion 61, and then follow the surface of the mounting block parallel to the casing 10. The strips 68 and 70 abut the foils 67 to form electrical contact therewith. In like manner, a pair of slots 72 and 74 extend through the end of the casing adjacent to the surface of the protrusion 61 on the opposite side of the protrusion from the slots 64 and 66. Electrically conducting strips 76 and 78 extend through the slots 72 and 74 and terminate in abutment with the surface of the protrusion 61. A pair of spaced electrically conducting foils 70 extend through the slot 16 and about the mounting pad 14 to form abutting electrical contact with the strips 72 and 74. The socket 62 contains four spaced electrically insulated terminals 80, 82, 84, and 86 which extend therein through channels 88 and follow the surface of the recess 62 in the socket 63 to form friction contacts with the four strips 68, 70, 76 and 78, respectively.

The combined casing 10 and socket 63 are mounted within a bracket 89 which is adapted to be secured to the tone arm of a record player in the conventional manner. The bracket 89 is provided with a circular opening 90 at one end, and a cylindrical portion 91 of the socket is accommodated within the circular opening 90. A leg portion 92 extends from the portion with the opening 90 and is adapted to be attached to a tone arm. The socket 63 is also provided with an outwardly extending flange 94 which engages the confronting portions of the bracket 89. The bracket 89 is also provided with a circular bore 96 at its opposite end, and a cylindrical stem 98 aligned with the axis of the casing 10 protrudes therefrom and is accommodated within the bore 96. The bracket 89 is provided with a notch 100 adjacent to the bore 96 therein, and the notch 100 accommodates a ridge 102 on the confronting surface of the casing 10 to maintain the casing in proper orientation and alignment with the bracket 88. Further, the casing is provided with an outwardly extending arm 104 for rotation of the casing 10 and socket 63 to orient the stylus 54 or 56 in the play position, the stylus 56 being shown in this position in FIGURE 1.

The styli 54 and 56 are permanent styli, that is, they last and perform for the entire life of the phonograph pickup. If it is desired to replace any portion of the pickup, the bracket 89 is expanded to remove the protrusion 61 from the socket 63, and thereafter to withdraw the stem 98 from the bore 96. Thereafter, a new pickup cartridge embodying the casing 10 and other elements therein, may be inserted into the bore 96 and the socket 63.

Since the drive arms 46 and 48 are constructed integral with the casing 10, the material of the casing becomes important. The drive arms 46 and 48 must have sufficient compliance to follow the highest frequencies impressed upon the record being reproduced, and must have sufficient damping to prevent overshoot at all frequencies. In a preferred construction of the present invention, the casing is constructed of Dylene which is a mixture of styrene and rubber. Other styrenes and vinyls have also been satisfactorily employed, particularly vinyl chloride. Hard rubber is also satisfactory. With type 682 Dylene, one construction has drive arms 46 and 48 with lengths of 0.625 inch, the diameter of the restricted portion 50 is 0.030 inch, and the diameter of the expanded portion 52 is 0.050 inch approximately. The styli 54 and 56 enter the drive arms 46 and 48 approximately 0.025 inch from the ends thereof opposite the connection to the casing.

It is, of course, to be recognized that not only the material of the casing controls the compliance and damping properties of the drive arms 46 and 48, but also the diameter of the restricted portions thereof and the length of the drive arms. By properly selecting the length of the drive arm and the diameter of the restricted portions thereof, it is possible to employ a wide range of materials for the casing, this range of materials being limited principally by the brittleness of the material, since it is necessary that the drive arms be capable of bending in their restricted portions. In addition to plastics and rubber, metals such as aluminum, copper and brass can be used, however, these are often undesirable from a cost point of view.

In the preferred construction referred to above, the crystals 22 and 24 are of Rochelle salt, although other types of crystals could also be employed with a loss in output. The styli have a diameter of approximately 0.016 inch and protrude from the drive arms 46 and 48 a distance of approximately 0.025 inch.

It will be recognized, that the mechanical undulations from one channel of a stereophonic record are transmitted by one of the styli to the lever arms of the pivot and lever arm members 30 and 36 with a vector which is normal to one of the lever arms and parallel to the other lever arm abutting that particular drive arm. As a result, each channel of a stereophonic record impresses its undulations upon only one of the crystals 22 or 24. When mechanical undulations are present in both channels of the stereophonic record, these are transmitted to the respective crystals 22 and 24 with a minimum of cross talk.

It is also to be noted that the casing 10 is provided with two outwardly extending ribs 106 and 108 extending parallel to the axis of the casing on opposite sides of each of the openings 42 and 44 therein. The ribs 106 and 108 prevent the drive arms 46 and 48 from being forced too far into the casing as a result of dropping of the tone arm and protect the crystals from damage.

When the phonograph picked herein disclosed is employed for monaural records, it will reproduce both lateral cut records and hill and dale records. However, for monaural records, both of the crystals are excited since the vector of the force impressed by the record is at approximately 45 degrees to the lever arms of the pivot and lever arm members 30 and 36. For this reason, the crystals 22 and 24 are connected in parallel electrically to respond to monaural records.

Those skilled in the art will readily devise many modifications to the phonograph pickup herein disclosed as a result of the teachings herein. Further, many modifications of the present phonograph pickup may be suggested by this disclosure to those skilled in the art. It is therefore intended that the scope of the present invention be not limited by the foregoing disclosure, but rather only by the appended claims.

The invention claimed is:

1. A phonograph pickup comprising a casing having a cavity therein and an opening from the cavity to the exterior of the casing, said casing having a drive arm integral therewith extending partially across the opening from one side thereof, the minimum cross-sectional dimensions and length of the drive arm being selected to produce compliance in the arm, a short rigid stylus mounted on the drive arm remote from the casing, an electromechanical transducer disposed within the cavity of the casing, and a mechanical linkage extending between the transducer and the drive arm of the casing.

2. A phonograph pickup comprising the elements of claim 1 wherein the casing is constructed of Dylene, the drive arm has a length of 0.625 inch and a minimum diameter of 0.030 inch, the portion of the arm having the minimum diameter extending for a distance of 0.125 inch from the end of the arm opposite the stylus.

3. A phonograph pickup comprising the elements of claim 1 wherein the electromechanical transducer comprises a first and a second plate shaped piezoelectric crystal electrically responsive to twisting mounted at one end in spaced relationship within the cavity of the casing, the arm being disposed on a plane extending between the crystals, and wherein the drive means comprises a first lever arm secured to the other end of the first crystal and slidably abutting one side of the drive arm, and a second lever arm secured to the other end of the second crystal and slidably abutting the same side of the drive arm.

4. A phonograph pickup comprising a casing having a cavity therein and an opening from the cavity to the exterior of the casing, said casing having two spaced bores on one side of the cavity, a first and a second piezoelectric crystal disposed within the cavity, a compliant pad mounted on the casing on the side opposite the bores, said pad engaging the crystals at one end thereof, a member mounted on the other end of each crystal having a shaft extending therefrom generally on the axis of said crystal and journaled within one of the bores, each of said members having a lever arm extending therefrom, the lever arms being normal to each other and extending through the opening, a drive arm secured to the casing at one end and extending over the opening, said drive arm slidably abutting each of the lever arms, and a stylus mounted on the other end of the drive arm.

5. A phonograph pickup comprising a first and a second twist responsive piezoelectric crystal mounted at one end, a lever arm secured to each crystal remote from the mounted end, the lever arms being normal to each other and each extending beyond the other from the crystal, a drive arm mounted at one end and slidably abutting the portion of each of the lever arms disposed on the side of the other lever arm remote from the crystal secured to said other arm, and a stylus mounted on the end of the drive arm opposite the mounted end thereof.

6. A phonograph pickup comprising the elements of claim 5 wherein the drive arm has a first portion of larger cross-section than a second portion, the stylus being mounted on the first portion and the second portion being adjacent to the casing.

7. A phonograph pickup comprising the elements of claim 5 in combination wtih a second lever arm secured to each of the crystals normal to the first lever arm secured to said crystal, each of said second lever arms extending beyond the other from the crystal, a second drive arm mounted at one end and abutting the portion of each of the second lever arms disposed on the side of the other second lever arm remote from the crystal secured to said other second lever arm, and a second stylus mounted on the end of the second drive arm opposite the mounted end thereof.

8. A phonograph pickup comprising a casing having a cavity therein and two openings located on opposite sides of the cavity from the cavity to the exterior of the casing, said casing having an integral drive arm extending partially across each of the openings from a first end of the casing, each of said drive arms having a noncompliant portion adjacent to a second end of the casing remote from said first end of the casing and a compliant portion of restricted cross-section adjacent to said first end of the casing, said casing having two spaced bores extending therein from the end of the cavity adjacent the second end of the casing, a resilient mounting pad mounted within the cavity of the casing adjacent to the first end of the casing having two spaced slots extending therein, a first piezoelectric bender crystal disposed in the first slot and extending therefrom, a first member mounted on the first crystal remote from the pad having an outwardly extending shaft journaled in one of the bores in the casing and a pair of lever arms extending therefrom normal to the drive arms and normal to each other, each of said lever arms slidably abutting a different drive arm, a second piezoelectric bender crystal disposed in the second slot of the pad and extending therefrom, a second member mounted on the second crystal remote from the pad having an outwardly extending shaft journaled in the other of the bores in the casing and a pair of lever arms extending therefrom normal to the drive arms and parallel with one of the lever arms of the first member, each of said lever arms abutting a different drive arm normal to the lever arm of the first member abutting said drive arm, and a stylus mounted on the end of each of the drive arms adjacent to the second end of the casing.

9. A phonograph pickup comprising a cartridge having styli projecting from opposite sides and a casing having a protruding end, said cartridge having at least two electrically conducting strips disposed on the surface of the protruding end, a socket having a recess accommodating the protruding end of the casing, said socket having electrical terminals insulated from each other extending therethrough to abut the strips of the cartridge, said socket also having a cylindrical portion remote from the casing and the casing having a stem extending therefrom remote from the socket, and a bracket constructed of spring metal having an opening accommodating the cylindrical portion of the socket and a bore accommodating the stem of the casing.

References Cited in the file of this patent

UNITED STATES PATENTS 2,856,465 Morrell et al. ............ Oct. 14, 1958
2,934,610 Dieter ................ Apr. 26, 1960

FOREIGN PATENTS 708,091 Great Britain .......... Apr. 28, 1954